July 25, 1961 J. L. BOWER 2,993,279

PHOTOELECTRIC GAGE

Filed April 8, 1958 4 Sheets-Sheet 1

INVENTOR.
JOHN L. BOWER

BY Edward A. Sokolski

AGENT

INVENTOR.
JOHN L. BOWER
BY Edward A. Sokolski
AGENT

July 25, 1961     J. L. BOWER     2,993,279

PHOTOELECTRIC GAGE

Filed April 8, 1958     4 Sheets-Sheet 3

INVENTOR.
JOHN L. BOWER

BY *Edward A. Sokolski*

AGENT

PHOTOELECTRIC GAGE

Filed April 8, 1958

INVENTOR.
JOHN L. BOWER

BY *Edward J. Sokolski*

AGENT

United States Patent Office 2,993,279

Patented July 25, 1961

1

2,993,279

PHOTOELECTRIC GAGE

John L. Bower, Downey, Calif., assignor to North American Aviation, Inc.

Filed Apr. 8, 1958, Ser. No. 727,221
7 Claims. (Cl. 33—125)

This invention relates to photoelectric gages and concerns particularly gages of the relatively moving optical grid type.

In order to produce highly precise indications of measurements and positioning of machine tools and for precise measurement of long distances as well as short distances, a digital register system is desirable. For producing digital indications, relatively movable grids may be provided as described in my copending application, Serial No. 520,086, filed July 5, 1955. In such a system there are numerous opaque lines ruled on translucent or transparent rods to form grids. In successive relative positions of the grids they permit light to be transmitted from a light source to photoelectric responsive means or cut off such light so as to produce electric impulses corresponding in number to the distance moved by one grid relative to the other. In order to increase precision, obtain indications of directionality and either register the net movement or totalize the excursions in one direction separately from the excursions in the opposite directions, a plurality of photoelectric tubes may be arranged in bridge connection so as to produce pairs of oppositely-phased impulses which in turn are so arranged as to introduce a quadrature or smaller angular relationship between the sets of oppositely-phased impulses.

The precision of measurement or the fineness with which measurements can be made or recorded is determined by the fineness of the gradations or ruling of the grids. Difficulties with which one is confronted in increasing precision by increasing the number of lines per inch include limitation in the number of lines which can be ruled and accurately spaced on a grating and tendency for increase in noise in the electrical circuits of light sensitive elements. By photographic methods, gratings may be made with a resolving power of 25,000 lines per inch.

It is accordingly an object of my invention to avoid noise in electrical circuits of the photoelectric gages and to obtain greater precision than that represented by the finest gratings which can be produced optically. More specifically, it is an object of the invention to accomplish noise-free gaging with a precision as fine as approximately ten microinches.

Still another object of the invention is to avoid the use of a multiplicity of light sensing or photosensitive detectors to achieve high precision. Moreover, it is an object to avoid difficulty in obtaining adequate light when modulating light sources and to avoid focusing problems in multiple lens systems which have been proposed to enhance precision.

Other and further objects, features, and advantages of this invention will become apparent as the description proceeds.

In carrying out the invention in accordance with a preferred form thereof, a light source and photosensitive device are used in conjunction with a stationary grating

2 and a movable grating to produce electrical impulses representative of the distance traveled by the one grating relative to the other by counting the impulses. In order to increase the precision of the measurement, the effective distance between gratings or the electrical wave length of the gratings is divided by interposing a chopper together with the relatively movable gratings in the optical path between the light source and the photosensitive device. In this way, the number of electrical impulses is greatly multiplied for a given relative movement of the gratings without introducing electrical noise or exceeding the resolving power which may be attained from photographically produced gratings. A better understanding of the invention will be afforded by the following detailed description considered in conjunction with the accompanying drawings in which FIG. 1 is a perspective view of the general type of photoelectrical gage in which the invention of this application may be employed;

Like reference numerals are utilized throughout the drawings to designate like parts.

Figure 1:
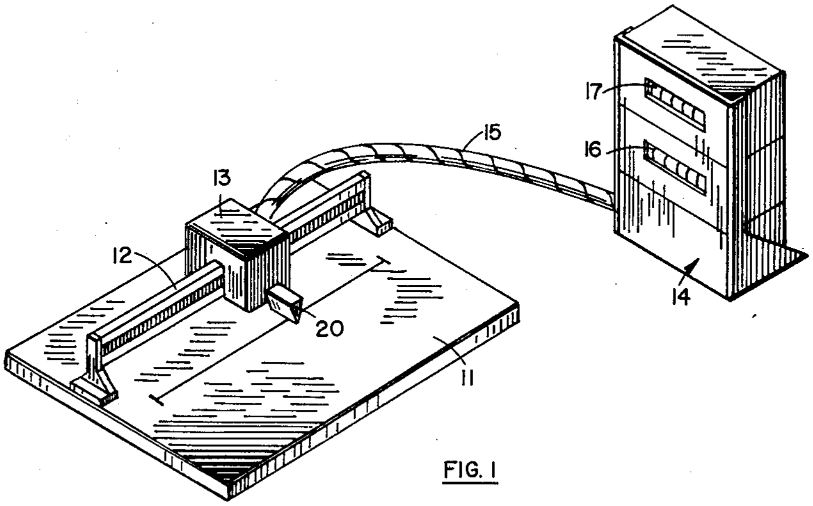

Referring to FIG. 1, there is shown a photoelectric gage having a base 11 upon which is mounted a rod 12 with a gage head 13 movable along the rod 12 in accordance with a linear measurement to be made or the positioning of a machine tool. A rough position indicator 20 is provided to give a direct indication of the position of the gage head relative to the rod. There is a register 14 connected to the gage head 13 having an electric cable 15 and a pair of dials 16 and 17 for recording the summation of movements of the gage head 13 in each direction. If desired, a single dial may be employed to indicate the net movement or the actual position of the gage head 13 in relation to the rod 12.

Figure 2:
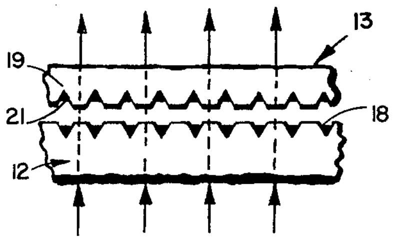
FIG. 2 is a fragmentary diagram illustrating the arrangement of relatively movable optical grids for producing light impulses as relative movement of the grids takes place.

As described in greater detail in my copending application, Serial No. 520,086, filed July 5, 1955, the rod 12 may be composed of translucent material such as quartz having a plurality of transverse grooves 18 (FIG. 2) filled with opaque material or having a plurality of closely spaced lines ruled thereon. It is to be understood that in FIG. 2 the dimensions are greatly exaggerated and that the division lines are actually very closely spaced being of the order of $\frac{2}{1000}$ of an inch or less apart. The gage head 13 also includes a grid 19 which corresponds to the gage rod 12 having grooves 21 corresponding to the grooves 18 of rod 12.

Figure 3:
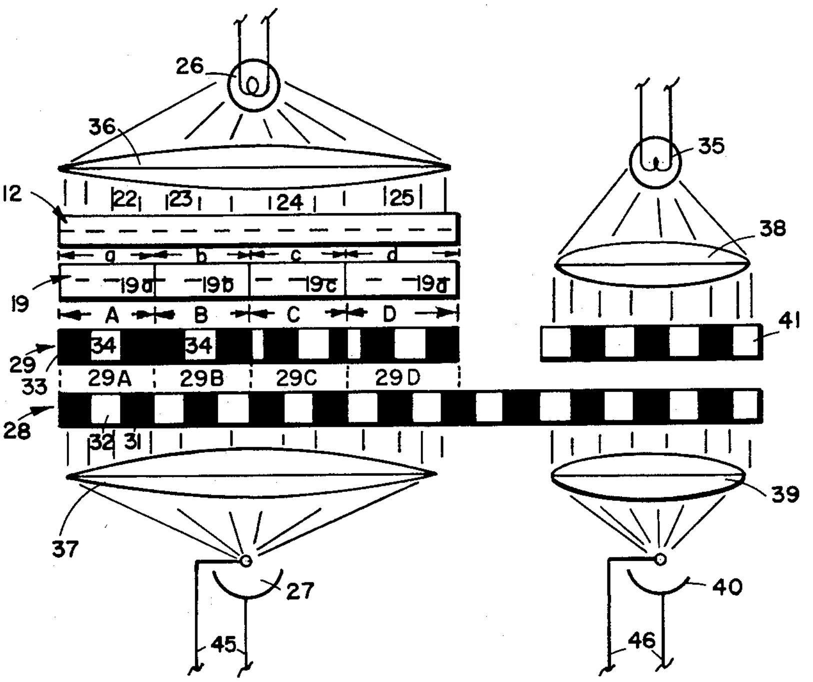
FIG. 3 is a schematic diagram illustrating the position of the gratings in relation to the light source and photosensitive device together with the precision increasing chopper.

As shown in FIG. 3, and described more fully in my copending application, Serial No. 678,886, the head grid 19 is divided into four separate portions: 19*a*, 19*b*, 19*c*, and 19*d*, so positioned in relation to the divisions of the grid 12 that when the head grid 19*a* presents minimum obstruction to the passage of light beams 22, the head grid 19*b* presents maximum obstruction to the passage of light beams 23. Likewise, the head grids 19*c* and 19*d* are so located in relation to each other that one presents maximum obstruction to the light beams 24 when the other presents minimum obstruction to the passage of the light beams 25.

However, the head grids 19*c* and 19*d* are so positioned in relation to the grid 19*a* and 19*b* that they are in an intermediate position when the head grids 19*a* and 19*b* are in a relatively opposite position. Employing the terminology of space-phase relationship, it may be said that the head grids 19*a* and 19*b* are positioned in opposed space-phase relationship; likewise the head grids 19*c* and 19*d* are positioned in opposed space-phase relationship; the head grids 19*c* and 19*d* are positioned in quadrature space-phase relationship to head grids 19*a* and 19*b*.

Figure 5:
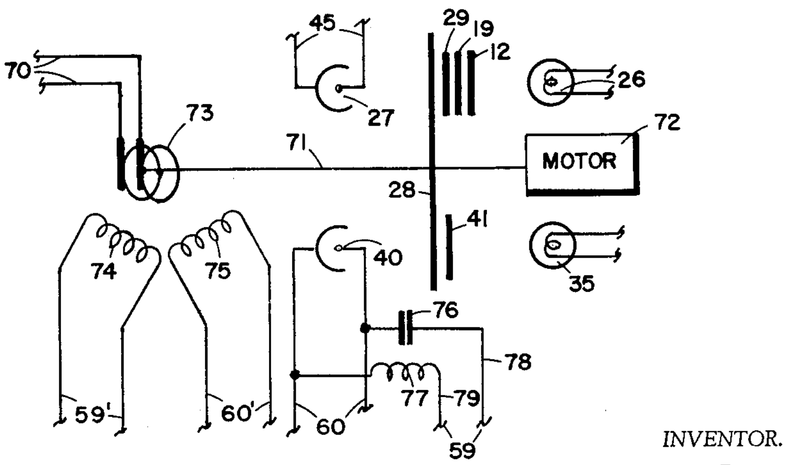
FIG. 5 is a schematic diagram of the arrangement of FIG. 3 showing the driving arrangement for the chopper and a resolver for electrical signals produced.

As a result of the space-phase relationship of the different portions of the head grid 19, it is possible to use a logical network as described more fully in the aforesaid copending applications to obtain indications of directionality as well as magnitude of gage movement. If a light source and a photosensitive device are used for each portion of the head grid, some increase in the precision or fineness of gaging may be achieved according to the number of portions into which the head grid is divided which differ among themselves in space phase. However, in order to avoid the necessity for using more than one photosensitive device for the actual production of the signals representing gage movement and to achieve a much greater increase in precision than would be possible by merely increasing the number of phases and optical paths, a light chopper is interposed in the optical path between the lamp light source 26 and a photosensitive device 27 in addition to the grids or gratings 12 and 19. As shown in FIGS. 3 and 5, the light chopper comprises a pair of relatively movable screens such as a slotted or perforated disc 28 and a chopper plate or screen 29 stationarily mounted in the head 13. The chopper members or screens 28 and 29, like the gratings 12 and 19, are composed of material having opaque and light transmitting portions alternating or the screens are composed of opaque material with openings or slots therein. In the arrangement illustrated, the rotatable disc 28 has uniformly spaced opaque portions 31 alternating with openings or light transmitting portions 32. The stationary screen 29 also has opaque portions 33 and light transmitting portions 34. However, the screen 29 mounted in the head 13 is also divided into portions 29A, 29B, 29C and 29D which are arranged in opposed and quadrature space-phase relationship as described for portions 19*a*, 19*b*, 19*c* and 19*d* in connection with the head grid 19.

Suitable focusing means represented by convex collimating lenses 36 and 37 are provided for converting the light emitted from the lamp 26 into parallel light beams 22, 23, 24 and 25 passing through the light occulting elements 12, 19, 29 and 28 and reconcentrating these light beams upon the photosensitive device 27.

For providing a reference-voltage source in order to accomplish directionality, an additional light source 35 and photoelectric responsive device 40 may be provided with an optical path between them including focusing lenses 38 and 39, a portion of the periphery of the chopper disc 28 and an additional stationary screen 41 mounted in the gage head 13.

Figure 4:
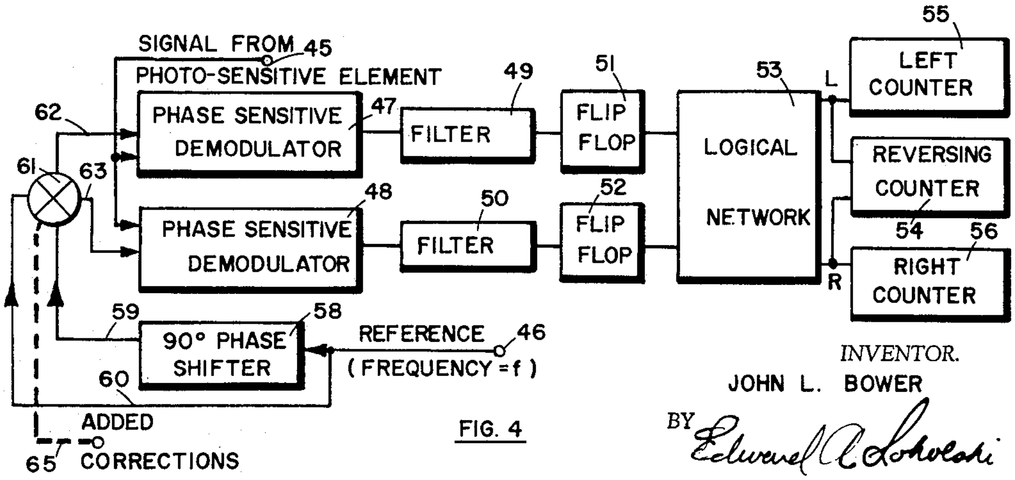
FIG. 4 is a block diagram representing the circuit arrangement of the electrical elements.

As relative movement of the grids 12 and 19 takes place, the light beams 22, 23, 24 and 25 are successively occulted in successive phase relationship. For interpretation of the electrical signals and their phase relationship to indicate directionality as well as distance, an apparatus such as illustrated in FIG. 4, including a phase sensitive demodulating means is provided. Moreover, as will be explained in detail hereinafter, the subdivision of the frequency of the light occultation in successive phase relationship as accomplished by the chopper elements 28 and 29 is also interpreted by the electrical circuits of FIG. 4 to increase the precision of the measurement.

The apparatus illustrated in FIG. 4 includes input terminal means 45 receiving the output of the photosensitive device 27 of FIG. 3 and reference voltage input terminal means 46 for receiving electrical output from the reference voltage light sensitive device 40 of FIG. 3.

There is a pair of phase-sensitive demodulators 47 and 48 receiving their inputs from signal input terminal means 45. These demodulators have filters 49 and 50 interposed in their respective output circuits which are respectively connected to bistable devices such as flip-flops 51 and 52. For interpretation of the states of the flip-flops 51 and 52 and the order in which they achieve those states as in the apparatus of application, Serial No. 678,886, filed August 19, 1957, a logical network 53 is provided. A single reversing counter 54 may be provided for indicating position at any instant. If it is desired to indicate the sum of the excursions to the left separately from the sum of the excursions of the movable grating to the right, a separate left counter 55 and a separate right counter 56 are provided.

For supplying appropriate reference phase voltage to the phase sensitive demodulators 47 and 48, a channel is brought from the reference frequency terminal means 46 to phase voltage input terminals of the demodulators 47 and 48. The arrangement is such that the phase voltages applied to the demodulators 47 and 48 are in quadrature. This may be accomplished, for example, by interposing a 90° phase shifter 58 in one of two channels 59 and 60 connected to resolver 61.

A resolver 61 is provided having input connections from the channels 59 and 60 and output connections through channels 62 and 63 to the phase sensitive demodulators 47 and 48 respectively. The resolver 61 is preferably of the type having input elements adjustable in position relative to output elements so that adjustment or correction may be made in the phase of the electrical output by means of a shaft 65 adjustable in angular position, indicated schematically in FIG. 4. The resolver has two pairs of input terminals and two pairs of output terminals for connection to the channels 59, 60, 62 and 63, each of which represents a pair of conductors in the form of the apparatus illustrated.

Figure 6:
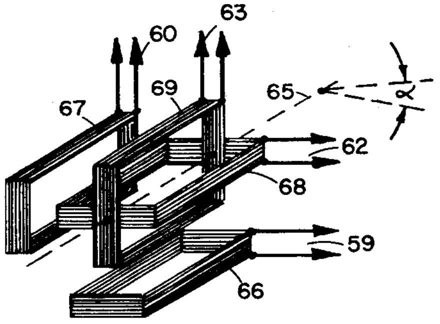
FIG. 6 is is a perspective diagram schematically illustrating the construction of the resolver shown in the system of FIG. 5.

For example, as shown in FIG. 6, the resolver 61 may comprise a pair of stationary coils 66 and 67 with a pair of coils 68 and 69 adjustable as a unit in angular position with respect to the stationary coils 66 and 67 and magnetically linked therewith. For adjusting the phase relationship between the electrical inputs and outputs, rotation of the coils 68 and 69 on the shaft 65 through a mechanical angle alpha results in a phase shift of alpha electrical degrees.

Referring to FIGS. 4 and 5, the phase shifter 58 employed in conjunction with the reference voltage photosensitive device 40 may take any suitable form such as a condenser 76 and a self-inductance coil 77 connected in series with conductors 78 and 79 respectively, the reactances of the condenser 76 and the inductance 77 being equal in absolute value at the occulting frequency of the chopper disc 28.

The reference voltage applied at the reference input terminal means 46 has a frequency corresponding to the light-interrupting frequency of the chopper 28 and 29. This may be accomplished as illustrated in FIGS. 3 and 5 by utilizing the same rotating chopper disc 28 in conjunction with a stationary chopper secreen 41 to supply light impulses to the photosensitive device 40. For example, as shown in FIG. 5, the chopper disc 28 is mounted upon a shaft 71 driven by a motor 72, the speed of which is very accurately maintained at a uniform level by means not shown. The invention is not limited thereto, however, and does not exclude the use of a two-phase multiple-pole generator 73 of suitable frequency such as illustrated in FIG. 5 driven by the same shaft 71 as the chopper disc 28 with two-phase output windings 74 and 75 for supplying the quadrature reference voltages in channels 62 and 63 to the phase-sensitive demodulators 47 and 48, as represented by pairs of conductors 59' and 60' connected to resolver 61. A direct-current excitation voltage may be fed in through conductive pair 70. In this case the phase shifter 58 is not required.

Figure 7:
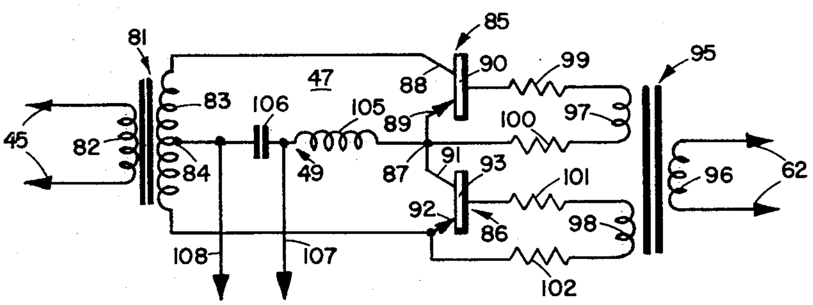
FIG. 7 is a circuit diagram of the filtered phase-sensitive demodulator employed in the apparatus of FIG. 4.

Although the invention is not limited to a specific type of phase sensitive demodulator, satisfactory results may be obtained from the filtering, phase-sensitive demodulator represented by the circuit diagram of FIG. 7. As shown, there is an input transformer 81 having a primary winding 82 connected to one of the input channels from the signal input terminal means 45 and a secondary winding 83 with a center tap 84. Electronic amplifier devices such as transistors 85 and 86 are connected in series to the secondary winding 83 having a common or junction terminal 87. As shown, the transistor 85 has a collector 88, an emitter 89, and a base 90; and the transistor 86 has a collector 91, an emitter 92, and a base 93. The collector 88 and the emitter 92 are connected to the ends of the transformer winding 83 whereas the emitter 89 and the collector 91 are connected to the junction 87. For supplying the phase reference to the demodulator 47 or 48, a phase voltage transformer 95 is provided having a primary winding 96 connected to one of the phase voltage channels 62 or 63 and independent secondary windings 97 and 98. The secondary winding 97 is connected through current-limiting resistors 99 and 100 to the base 90 and the emitter 89 of the transistor 85. Likewise the winding 98 is connected through resistors 101 and 102 to the base 93 and the emitter 92 of transistor 86.

The terminals 84 and 87 constitute the output terminals of the phase-sensitive demodulator 47 at which a unidirectional voltage appears which remains unidirectional as long as the same phase relationship exists between voltages applied to the windings 82 and 96. It varies in strength with variations in phase, since the peak voltages applied to the windings 82 and 96 are normally maintained constant. Reversal in phase results in reversal of polarity of the voltages between the terminals 84 and 87. The filters 49 and 50 shown in FIG. 4 and FIG. 7 may take the form of low pass filters consisting of inductance 105 and capacity 106 connected in series between the terminals 87 and 84, with the output conductors 107 and 108 of the phase-sensitive demodulator connected across the condenser 106.

Referring to FIG. 4, the manner in which the output signals of the phase-sensitive demodulators 47 and 48 produce electrical signals for use in the flip-flops 51 and 52 and the logical network 53, to represent gage movements of high precision will become apparent from the following mathematical analysis. The rotating screen 28 of the chopper (FIGS. 3 and 5) is used to modulate the light in the usual manner except that the phase of the modulation is different for different portions of the stationary screen 29. It is assumed that the light flux of portion "*a*" of the grating 19 is $$\phi_a=\left(\cos 2\pi\frac{x}{\lambda}+K\right) \qquad (1)$$

where $\lambda$ is the wave length or spacing between gratings of the grids 12 or 19; $x$ is the distance measured in terms of relative displacement of movable grid 12, and K is a constant.

This light flux is modulated by in-phase modulator consisting of the chopper with its screens 28 and 29. The flux passing through the portion "*a*" of the grating 12, portion "A" of screen 29 and the rotating screen 28 is $$\phi_A=\phi_a\ (\cos 2\pi ft+\phi_0) \qquad (2)$$

where $f$ is the rotational speed in opaque line portions per second of the rotating chopper screen 28, $t$ is time in seconds and $\phi_0$ is another constant.

$$\phi_b=\left(-\cos 2\pi\frac{x}{\lambda}+K\right) \qquad (3)$$

where $\phi_b$ is the light flux of the portion "*b*" of the grating 19.

Owing to the phase relationship between the slots in the portions A and B of the stationary screen 29, the following equation applies:

$$\phi_B=\phi_b\ (-\cos 2\pi ft+\phi_0) \qquad (4)$$

where $\phi_B$ is the flux passing through the portion B of the screen 29 and the chopper disc 28. Accordingly, the total flux through the portions A and B of the chopper is $$\phi_A+\phi_B=2\left(\cos 2\pi\frac{x}{\lambda}\cos 2\pi ft+K\phi_0\right) \qquad (5)$$

Likewise, owing to the fact that the flux passing portion C and D of the screen 29 is modulated in time and space quadrature relative to the flux of the portions A and B, the following equations also hold:

$$\phi_C+\phi_D=2\left(\sin 2\pi\frac{x}{\lambda}\sin 2\pi ft+K\phi_0\right) \qquad (6)$$

$$\phi=\phi_A+\phi_B+\phi_C+\phi_D$$
$$=2\left(\sin 2\pi\frac{x}{\lambda}\sin 2\pi ft+\cos 2\pi\frac{x}{\lambda}\cos 2\pi ft\right)$$
$$+4K\phi_0=2\cos 2\pi\left(ft-\frac{x}{\lambda}\right)+4K\phi_0 \qquad (7)$$

The term $4K\phi_0$ is a constant and is eliminated by the simple low pass filter 105—106. Consequently, what remains is a true phase-analog signal with phase velocity $\lambda f$.

The development of signals that bear a two-phase relationship to space is accomplished in the demodulator system of FIG. 4, using a reference signal of frequency $f$.

The function of the flip-flops 51 and 52, and logical network 53 is the same as in the photoelectrical gages described in the copending applications. As in previously referenced copending application Serial Number 520,086, a graph may be drawn illustrating the state of flip-flops controlled by the information provided by each of phase sensitive demodulators 47 and 48, as in FIG. 8. It can be seen that the ordinate is voltage, "E," and the abscissa is relative motion of the gauge 13 head relative to the gauge rod 12. When demodulator 47 has a positive output signal, the information A' is provided by one state of flip-flop 51. When demodulator 47 has a negative output signal, the information A from flip-flop 51 is provided. Removed 90 degrees, or $$\frac{N}{4}\lambda$$

from the square wave produced by flip-flop 51 is the square wave produced by flip-flop 52. Proposition B' is indicated by flip-flop 52 being in a state set by positive output from demodulator 48 and proposition B is indicated by the flip-flop 52 being in the other state set by negative output from demodulator 48. It will be noted that a complete square wave is generated each one five-hundredths of an inch of motion between gauge head and gauge rod. From these two square waves is written a logical equation which utilizes the information provided by each state of the flip-flops and each change of state of the flip-flops to indicate the direction the head is traveling with respect to the gauge rod and a pulse for every one two-thousandths of an inch traveled. Further notations are made indicating "$a'$" as being a change from "A′" to "A," and "$a$" being a change from "A" to A′"; also, "$b'$" is a change from "B′" to "B," and "$b$" is a change from "B" to "B′." A logical equation can now be written from inspection of FIG. 8 indicating the right or left motion of the gauge head and gauge rod with respect to each other. The equation is written as follows:

$$R=aB+bA'+a'B'+b'A \tag{8}$$

$$L=aB'+a'B+b'A'+bA \tag{9}$$

The notation "R" stands for a motion in the right direction, and "L" stands for a motion in the left direction of one two-thousandths of an inch which is indicated by a pulse. The notation, such as $a$B, indicates the proposition that both must occur, that is, it is a coincidence notation. The notation "+" indicates the relation "or"; that is, in the Equation Number 8 above a pulse indicating "R" motion occurs if $a$ and B occur, or $b$ and A′ occur, or $a'$ and B′ occur, or $b'$ and A occur. A′ and A are complements and each occurs when the other does not. The same is true of B and B′. A referral to FIG. 8 corroborates the foregoing.

Figure 8:
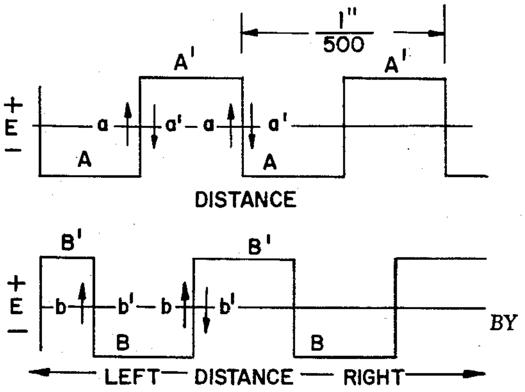
FIG. 8 is a graphical representation of the output provided by the flip-flops shown in FIG. 4.

From Equations 8 and 9 above, it will be noted that both "and" and "or" logical gates must be used and, in addition, referring to FIG. 8, it will be noted that the propositions $a$, $a'$, $b$ and $b'$ are changes, or derivatives. Therefore, some form of derivative circuit must be utilized in the logical network 53.

Figure 9:
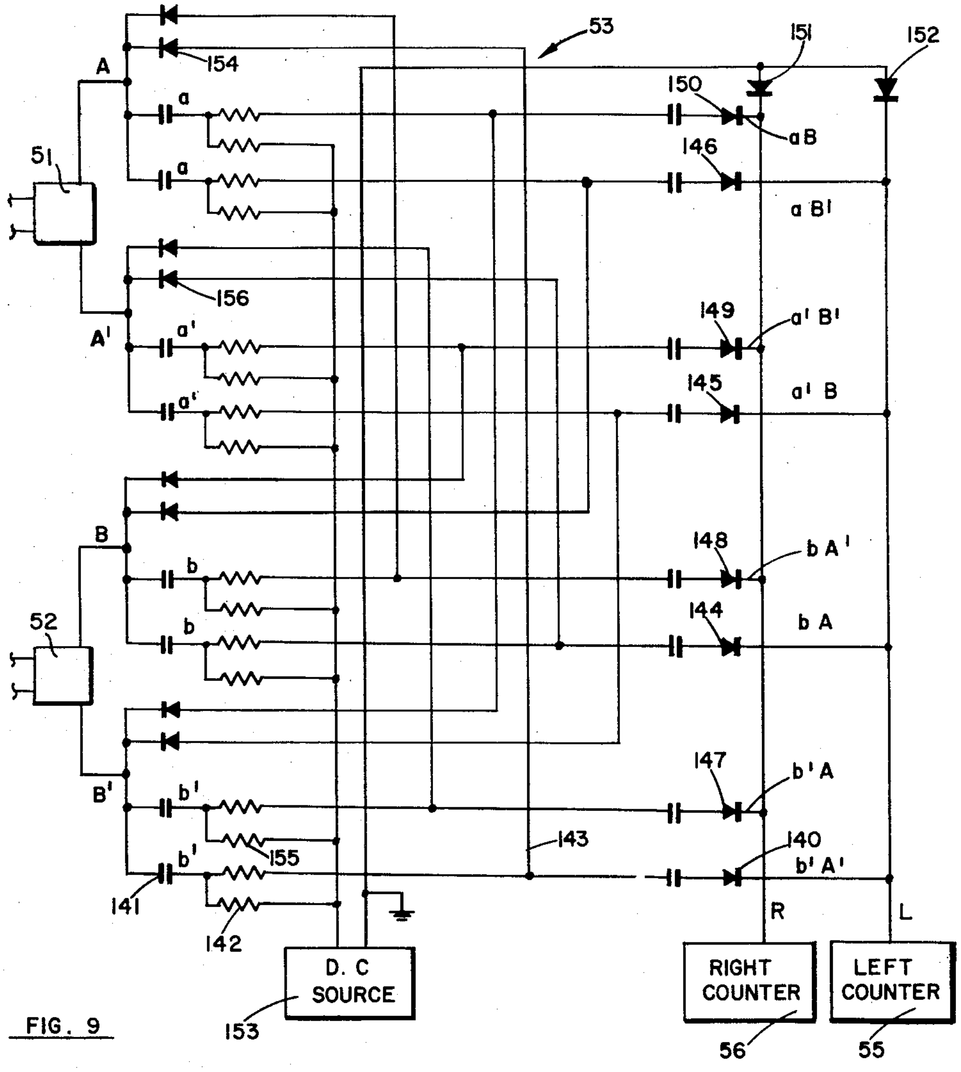
FIG. 9 is a schematic diagram of the logical network 53 shown in FIG. 4.

FIG. 9 is an electrical schematic of the logical network 53 receiving at its input propositions A, A′, B and B′, and providing at its two outputs R to the right counter 56 and L to the left counter 55. Referring momentarily to Equations 8 and 9, it can be seen that a pulse is received at left counter 55, through diode 140, according to the output of a derivative circuit consisting of capacitor 141 and resistor 142, providing flip-flop 51 is in the state A′. Assume −3 volts on one output line of flip-flop 51 represents the existence of the proposition or the true state and 0 volt on the other line represents the nonexistence or false state. It can be seen that if flip-flop 51 is in state A, diode 154 will be biased to allow conduction and the pulse $b'$ from capacitor 141 will pass through line 143 and not pass through diode 140. However, if flip-flop 51 is in state A′, diode 154 is nonconducting and the pulse through capacitor 141 passes through diode 140 and reaches left counter 55. Other diodes 144, 145 and 146 provide similar pulses to left counter 55. Right counter 56 receives similar pulses through diodes 147, 148, 149 and 150.

Low voltage D.-C. source 153 holds the lines connected to the resistors such as 142 and 155 below ground. Thus, output pulses are possible only on lines whose control diodes, such as 154 and 156, have cathodes at ground potential (that is, 0 volt).

Diodes 151 and 152 allow only positive pulses to reach the counters.

If desired, four time-modulated light sources may be substituted for the rotating and stationary screen arrays retaining a single photosensitive device and other features of a phase-analog signal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An apparatus for increasing the precision of a numerical gage of the relatively moving displaced-phase grating type interposed in an optical path between a light source and a light responsive electrical device, said precision increasing apparatus comprising a stationary screen and a rotatable chopper screen interposed in the optical path of the numerical gage, one of said screens having alternating opaque and translucent portions evenly spaced and the other of said screens having alternating opaque and translucent portions displaced in phase space whereby the phases of the gratings are divided according to the light occulting frequency of the chopper.

2. An apparatus as in claim 1 wherein phase-sensitive demodulators are provided responsive to output of the light-responsive electrical element and having phase-reference input terminals, reference generating means connected to said input terminals for providing reference voltages displaced in phase and of frequency corresponding to the light occulting frequency of the chopper.

3. An apparatus as in claim 2 wherein said reference generating means comprises an additional illuminated optical path, a photoelectric responsive device included in said additional path, and a second stationary screen intercepting said additional path, said path being so positioned so as to be intercepted by said rotary chopper screen.

4. A numerical gage comprising in combination a light source, a stationary grating, a movable grating, the movable grating being connected to a member, the position of which is to be gaged, one of said gratings being divided into a plurality of sections displaced in space phase from each other, a chopper comprising a stationary screen and a rotating screen each divided into opaque and light transmitting portions, the rotating screen having the opaque and light transmitting portions uniformly spaced, the stationary screen being divided into a plurality of sections displaced in space phase with the opaque and light transmitting portions within any section being uniformly spaced, a light-responsive electrical element, said gratings and screens being mounted in an optical path between said light source and said light-responsive element, means for generating an alternating voltage having a frequency corresponding to the light occulting frequency of said chopper, a phase shifting unit connected to said reference voltage source to produce two reference voltages of the same frequency but displaced in phase from each other, a resolver having a pair of input windings displaced in phase and a pair of output windings correspondingly displaced in phase, the input windings being connected to the respective phase outputs of the phase shifting unit, a pair of phase-sensitive demodulators each having reference voltage input terminals connected to the respective output terminals of the resolver, said light-responsive electrical device having output terminals connected to said phase-sensitive demodulators, low pass filters included in the output circuits of said phase-sensitive demodulators, bistable devices connected to said filter outputs, a logical network connected to said bistable devices for converting the phase relationships between the reference voltages and light responsive output voltage into digital signals, and counter means responsive thereto for producing numerical indications of the relative positions of the stationary and movable gratings with a precision of the order of the fineness of the graduation of the gratings multiplied by twice the number of phases.

5. Apparatus as in claim 4 wherein the reference voltage producing means comprises an additional illuminated optical path, a photoelectric responsive device included in said additional path, and a second stationary screen intercepting said additional path, said path being so positioned so as to be intercepted by the said rotary chopper screen.

6. Apparatus as in claim 4 wherein the reference voltage source and the phase shifting unit comprise a motor having a shaft carrying said chopper rotating screen and a rotor, and a stator with a number of poles corresponding to the number of opaque and light transmitting portions of the chopper screen, one of said stator and rotor comprising a two-phase winding and the other comprising an exciting winding for connection to a source of direct current.

7. A numerical gage, comprising in combination relatively movable gratings, the relative movement of which constitutes the quantity to be gaged, a light source, a photosensitive device, the gratings being interposed in the optical path between the light source and the photosensitive device, and a light chopper interposed in the same optical path for subdividing phases represented by the grating spacings to increase precision of gaging, said light chopper comprising a rotatable screen and a fixed screen each having alternating opaque and translucent portions.

References Cited in the file of this patent

UNITED STATES PATENTS

| | | |
|---|---|---|
| 2,311,142 | Turrettini | Feb. 6, 1943 |
| 2,375,665 | Koulicovitch | May 8, 1945 |
| 2,604,004 | Root | July 22, 1952 |
| 2,651,771 | Palmer | Sept. 8, 1953 |
| 2,685,082 | Beman et al. | July 27, 1954 |